United States Patent [19]

Burn

[11] Patent Number: 4,510,175
[45] Date of Patent: Apr. 9, 1985

[54] NEWTONIAN CERAMIC SLIP AND PROCESS FOR USING

[75] Inventor: Ian Burn, Williamstown, Mass.

[73] Assignee: Sprague Electric Company, North Adams, Mass.

[21] Appl. No.: 502,878

[22] Filed: Jun. 9, 1983

[51] Int. Cl.³ .................... B05D 5/12; H01G 13/00
[52] U.S. Cl. ................................. 427/79; 427/420
[58] Field of Search ................. 427/79, 123, 420

[56] References Cited

U.S. PATENT DOCUMENTS

| | | | |
|---|---|---|---|
| 2,582,993 | 1/1952 | Howatt | 25/156 |
| 3,125,618 | 3/1964 | Levinson | 264/63 |
| 3,717,487 | 2/1973 | Hurley et al. | 106/48 |
| 3,998,917 | 12/1976 | Adelman | 264/63 |
| 4,027,209 | 5/1977 | Maher | |
| 4,060,649 | 11/1977 | Coleman | 427/420 |

Primary Examiner—Richard Bueker

[57] ABSTRACT

A ceramic slurry or slip includes ceramic powder, an organic plasticizer and a resin binder combined in an aromatic hydrocarbon solvent and has a viscosity that is independent of shear rate. Monolithic ceramic capacitors having fewer pin holes are made by forming a falling sheet of this Newtonian slip, and repeatedly interrupting the falling curtain by passing a carrier through it to form layers of green ceramic. An electroding film is deposited on each green ceramic layer to form buried electrodes. The Newtonian slip is advantageously self leveling and contains relatively few pin holes that degrade capacitor performance.

1 Claim, 2 Drawing Figures

NEWTONIAN CERAMIC SLIP AND PROCESS FOR USING

BACKGROUND OF THE INVENTION

This invention pertains to a ceramic slip composition and more particularly to a slip having low viscosity and Newtonian behavior for use in a curtain coating step in a method for making monolithic ceramic capacitors.

Monolithic ceramic capacitors are made by interleaving electrode films between adjacent layers of green ceramic forming a stack. The stack is fired to burn out organic binders and to sinter the ceramic to maturity. Alternate ones of the electrodes extend to one end of the sintered body while the other electrodes usually extend to an opposite body end. Terminals are formed at each of these body ends to contact the two alternate sets of buried electrodes as is more fully described, for example, in U.S. Pat. No. 4,027,209 to G. Maher, issued May 31, 1977 and assigned to the same assignee as is the present invention.

The production of green ceramic layers by present day manufacturers of monolithic ceramic capacitors is accomplished mainly by two methods. The most prevalent is known in the industry as the "tape" process whereby a ceramic slurry is extruded under hydraulic pressure onto a moving carrier on a conveyor belt. The other is known in the industry as the curtain coating process whereby a falling sheet or curtain of a ceramic slurry is interrupted and carried away in a central portion by a moving carrier on a conveyor belt.

The tape process is illustrated and further described by Howatt in U.S. Pat. No. 2,582,993 issued Jan. 22, 1952 and by Lindquist in U.S. Pat. No. 3,660,328 issued May 2, 1972. On the other hand the flip process is further described by Hurley et al. in U.S. Pat. No. 3,717,487 issued Feb. 20, 1973 and by Coleman in U.S. Pat. No. 4,060,640 issued Nov. 29, 1977. The later two patents pertain directly to the present invention, are incorporated by reference herein, and are assigned to the same assignee as is the present invention.

Both the tape and the curtain coating process use a ceramic slurry or paint. These ceramic paints have a pseudoplastic rheology, i.e. the viscosity of the paint increases with decreasing shear rate, just as for house paints. House paints are required to work or brush easily but after application the still paint is expected to set without running. For making multilayer capacitors this has the particular disadvantage that each layer of ceramic has the same thickness over electroded regions, leading to a central bump in the stack corresponding to the underlying electrodes. This makes it difficult to make capacitors conform to certain requirements for uniform dimensions. Deposition of electroding ink to each dielectric layer becomes progressively more difficult as the surface becomes more uneven. This can adversely affect capacitor properties such as capacitance tolerance and breakdown strength.

The occurrence of pin holes in monolithic ceramic capacitor dielectrics is an additional problem for capacitors made using the prior art processes. Under some circumstances, pin holes in capacitors made by curtain coating occur such that specifications relating to dielectric strength or leakage current cannot be met with high yields. This may be alleviated by using a mixed solvent system in the slip as described by Levinson in U.S. Pat. No. 3,125,618 issued Mar. 17, 1964 or by using a smaller quantity of organic binder in the slip. Such curative steps, however, tend to give a weaker green ceramic body that is prone to crack during the cutting apart of the individual green capacitor bodies. These pin-holing and green-strength problems are even more acute when finer powders are used. In pseudoplastic materials, the fines dictate the properties of the suspension.

It is an object of the present invention to provide monolithic ceramic capacitors having higher quality, namely uniformity of dimensions and electrical properties and with better physical integrity, e.g. fewer pin holes and cracks.

It is a further object of this invention to provide an improved method for making such higher quality capacitors including a curtain-coating step employing a low viscosity ceramic slip having Newtonian rheology, i.e. a viscosity independent of shear rate.

SUMMARY OF THE INVENTION

A Newtonian ceramic slip for making monolithic ceramic capacitors by a process including depositing layers of the slip by curtain coating and sintering the layers, comprises a ceramic powder having a mean particle size of from 0.5 to 1.5 $\mu$m, a water-insoluble resin binder, a plasticizer and a non-halogenated hydrocarbon solvent for the resin. The amount of the plasticizer plus resin is no more than 10 weight percent of the powder. The solvent may also include an alcohol in amount from 0 to 70% by weight of the hydrocarbon. The binder, plasticizer and ceramic powder are mixed in the solvent to make the slip Newtonian and substantially unaffected by the addition of up to 0.25 weight percent water.

Monolithic ceramic capacitors are made by providing a falling sheet of this Newtonian slip, moving a substrate having a porous upper surface through the falling slip a number of times, interleaving a film of electroding ink between ceramic slip layers in the ceramic layer stack, dicing the stack into a multiplicity of pieces, firing to drive out the organics and sintering the ceramic.

DESCRIPTION OF THE PREFERRED EMBODIMENTS

Figure 1:
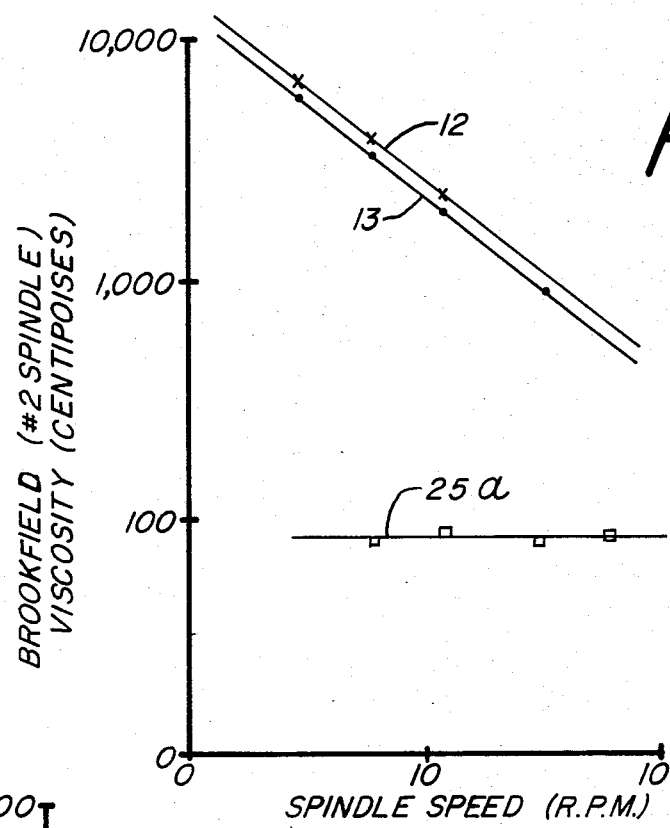
FIG. 1 shows a log-log graph of Brookfield viscosity (using a no. 2 spindle) versus spindle speed of two pseudoplastic slips of the prior art and of a Newtonian slip of this invention.

A number of experimental ceramic slips were made by dissolving a polymethacrylate binder and a plasticizer in a solvent composed of a non-halogenated hydrocarbon to which an alcohol was added in some of the experiments. Ceramic powder was then dispersed by ball milling in this vehicle of binder, plasticizer and solvent to form a ceramic slip.

The purpose of these experiments was to find new curtain coating slips leading to monolithic ceramic capacitors of improved quality. Surprisingly, it was discovered that Newtonian slips made better quality capacitors and that the formulation of Newtonian slips may differ very little from their pseudoplastic predecessors.

The binders chosen were limited to resins that have a long history of reliable use in ceramic slurries. In particular, Elvacite 2044 a butylmethacrylate and Elvacite 2014 a methylmethacrylate copolymer (made by E. I. du Pont de Nemours Co., Wilmington, Del.) were used. Also a few examples are given wherein Butvar 98, a polyvinyl butyral made by Monsanto Co., St. Louis, Mo. was used. Xylene among the hydrocarbon solvents for such resins is a good choice because it has a low boiling point that will dry quickly while having a higher flash point than many hydrocarbons that makes it safer to use. Halogenated hydrocarbons should not be used because they are toxic. Nine slip formulations in Examples 1 through 9 are shown in Table 1 along with the corresponding Brookfield viscosities at 25° C. over a wide range of spindle speeds, using a #2 spindle. The barium titanate powder used in these slips has a surface area of about $3M^2/gm$ corresponding to an average particle size of about 1.2 $\mu m$ (equivalent spherical diameter). The surfactant, Alcolec which is a soybean derived lecithin, was supplied by American Lecithin Co. and Gafac, a phosphate ester was supplied by GAF Corporation, New York, N.Y. The plasticizer, Abalyn, is made by the Hercules Co., Wilmington, Del. The vehicle ingredients are given as percent by weight of the solids content, namely the barium titanate. The amyl acetate (amyl-a.) used in these slips is a solvent modifier that has been conventionally employed for years in ceramic curtain coating slips.

All of these slips are seen to exhibit pseudoplastic behavior and most have a high viscosity even at the higher spindle speeds. The lower solids contents of slips 4 through 9 provide lower viscosities as would be expected. Pseudoplastic behavior persists however with or without a surfactant, with or without amyl acetate (Example 8), with or without xylene (Example 9) and over a wide range of relative amounts of these ingredients. The curtain coating slip formulations of Examples 5 and 6 have been used extensively in the past for making monolithic ceramic capacitors.

To find and enumerate pin holes in a completed capacitor for a variety of experimental ceramic slips is an arduous task. The mechanisms by which pin holes are formed are not completely understood. When the carrier on which the first slip layer is deposited is nonporous, that first layer never has pin holes in it regardless of slip rheology. First layers on porous substrates may or may not have pin holes but the number of pin holes in a stack of many layers will be substantially less than if made on a nonporous substrate. Some slips are much more prone to pin-holing than others. It has been found that the number of pin holes per square area that can be seen in the surface of a second layer, wherein the first was deposited on a nonporous (glass) substrate, correlates well with the density of pin holes that will be produced by that particular slip in a completed capacitor. The observation and enumeration of pin holes in a second dried-green ceramic layer was conducted under 30× magnification. Each green layer had a thickness of about 1 mil (0.025 mm) after drying at 60° C. for 4 minutes. The second test layer on a glass carrier has many times more pin holes than in a second layer of the same slip on a porous substrate. A sensitive test for slips is thus provided and by this test it was found that Newtonian slips are much less prone than pseudoplastic slips to pin-holding without exception.

Furthermore, in the curtain coating process of making monolithic capacitors with buried electrodes interleaved between ceramic layers, the Newtonian layers level. They level and do not conform to the electrode thus avoiding a progressively aggravating bump with subsequent layers as in the prior art.

In another series of experimental slips, represented by Examples 10 through 25, the same barium titanate powder was used. Some of the same vehicle ingredients employed in slips 1 through 9 were used again here except in some slips (14 through 19) an alcohol, i.e. ethanol, propanol (pro alc.) or methyl cellosolve (me cell.) was combined with xylene to form the solvent.

The binder in the slips of Examples 25b and 25c in Butvar 98 (Butv), a polyacetate resin. The alcohol solvent component is propanol (pr alc.). As can be seen from the Newtonian behavior and stability in the presence of water, these slips are suitable for making capacitors according to this invention. However, capacitors made with slips employing polyacetate resins do not release well from the carrier plate and thus the green ceramic capacitor body is difficult to remove without damage. For that reason, polymethacrylate binders are preferred.

The slip of Example 10 has a strikingly low viscosity and is substantially Newtonian even though in comparison with the viscous and strongly pseudoplastic slip of Example 4 (Table 1), the weight percent of resin binder, solvent and ceramic powder remained the same. However, when in Example 11, a little water was added, this material gelled and became useless as a curtain coating slip. In this as well as some of the following examples, 0.25 wt.% water relative to the amount of the ceramic was added to the slip to simulate the effect of a high humidity environment in which the curtain coating slip may be stored and used. An asterisk indicates such examples.

The rest of the slips described in Table 2 have a higher solids content and an essentially constant weight percent of total solvent. The effects of changing amounts of Abalyn, Gafac and Elvacite as well as varying the types of Gafac and Elvacite are demonstrated.

The pseudoplastic character of the slip of Example 12 is hardly affected by the addition of water, Example 13. The same Gafac RS-410 used in these examples is retained in the following Examples 14 through 17 wherein ethanol is substituted for some of the xylene solvent in varying amounts. These slips are stable in the presence of water and they exhibit a substantially Newtonian rheology with lower viscosities and higher solids content than prior art slips such as in Examples 5 and 6 that have more solvent and are also pseudoplastic. The solids to solvent content by weight of the slip in Examples 5 and 6 is 2.6. The weight ratio of solids to solvent in slips 14–17 ranges from 3.3 to 4.5.

Newtonian slips with low viscosity are also possible to make with other alcohols than ethanol, as illustrated in Examples 18 and 19 wherein solids to solvent ratios are 3.6 and 3.4 respectively.

In Examples 20 to 25, Elvacite 2014, having a lower molecular weight and higher acid number (13 mgKOH/gm) is used. In the first five of these, the solvent is pure xylene, the solids to solvent ratio ranges from 3.3 to 3.7 and there is no surfactant. Not only are these formulations Newtonian and have low viscosity but they are stable in the presence of water in spite of having no alcohol as demonstrated in Example 21 and 24. In Example 25, the addition of only one quarter of one percent surfactant rendered the slip pseudoplastic.

The low-viscosity and Newtonian slip of Example 25a along with the viscous pseudoplastic slips of Examples 12 and 13 again illustrate seemingly unpredictable effect of surfactant additions. Here, it causes a large upward change in viscosity and it destroys the Newtonian properties of the simple powder and vehicle slurry, and at the same time it desensitizes the pseudoplastic slip to water.

In Table 3 slip formulations in Example 26 through 30 are shown, which slips employ PLZT powders (lead lanthanum zirconate titanate). This lead titanate includes a silver dopant as is further described by G. Maher in U.S. Pat. No. 4,219,866 issued Aug. 26, 1980 and assigned to the same assignee as is the present invention. As for the barium titanate powder used in the preceeding examples, the average particle size of the PLZT powder is 1.2 μm.

The slip of Example 26 is a pseudoplastic prior art slip having been adjusted for maximum solids to solvent content (4.1) and attaining a curtain-coating-standard viscosity of 500 cps at a Brookfield spindle speed of 30 r.p.m. The Newtonian slips of Examples 27 and 28 using Elvacite 2044 for the resin binder and an alcohol, i.e. butanol and ethyl cellosolve (et cell.) respectively, in the vehicle each have a solids to solvent content of 5.3. Note that water has been added to these three slips without deleterious effect.

The Newtonian slip of Example 29 uses Elvacite 2014 and no alcohol and has a solids to solvent content of 3.8. When the surfactant is omitted, as in Example 30, that slip becomes very viscous.

Figure 2:
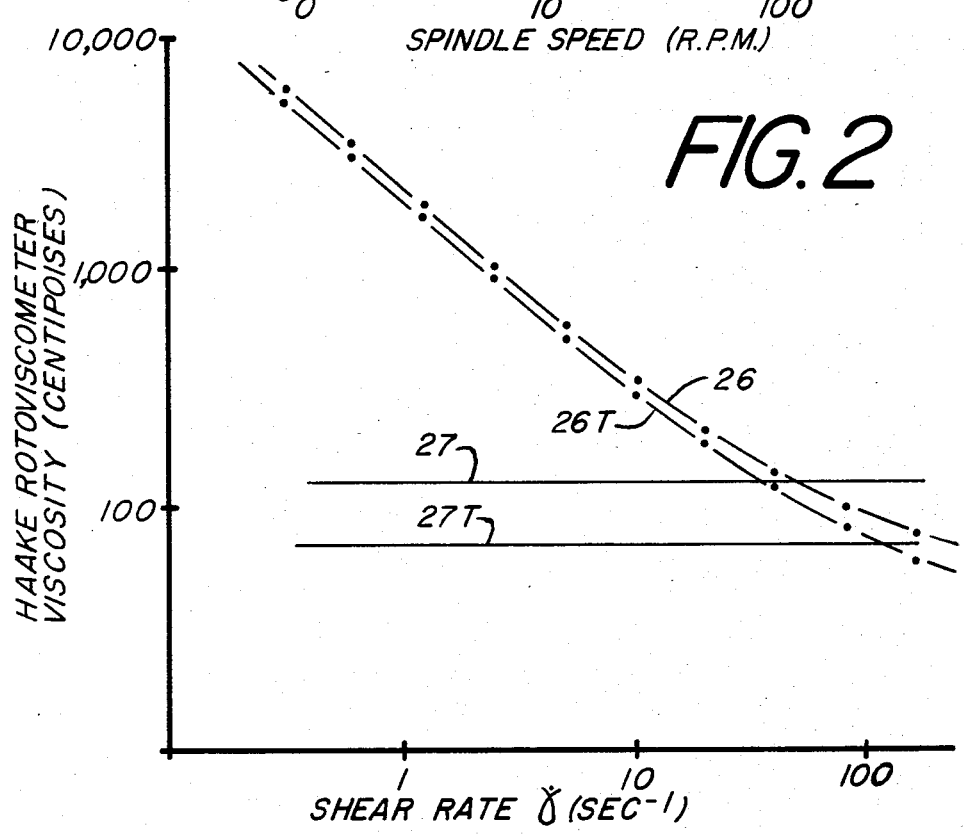
FIG. 2 shows a log-log graph of viscosity as a function of shear rate as measured on a Haake Rotoviscometer of another pseudoplastic prior art slip and of another Newtonian slip of this invention.

Since at the lower spindle speeds in a Brookfield viscometer the actual shear rates are less accurately known, the pseudoplastic slip of Example 26 and the Newtonian slip of Example 27 were tested at 25° C. in a Haake Rotoviscometer that is not as convenient to use but provides more reliable indication of low shear rates. This data appears in the graph of FIG. 2 as curves 26 and 27 respectively and correlates closely with the Brookfield data given for these slips in Table 3. Curves 26T and 27T show the effect of elevating the temperature to 50° C.

For the slips of Example 31 through 36 shown in Table 4, a fine titania powder was used. The average particle diameter is 0.5 μm giving a calculated surface area of $15M^2/gm$. The particles are quite spherical, as observed by scanning electron microscope, and had a narrow particle size distribution, namely 90% less than 1.0 μm and 10% less than 0.2 μm.

It was necessary to greatly reduce the solids content in these slips to achieve a Newtonian characteristic and at the same time a water insensitive rheology. The solids to solvent ratios of the substantially Newtonian slips of Examples 31 through 37 range from 1.2 to 2.2 while that of the pseudoplastic slip of Example 36 is 2.0.

The addition of Abalyn or another plasticizer is usually needed to give flexibility to the green dried capacitor cake so that it may be cut without cracking. Such plasticizer additives have been found to have no discernible influence on the rheology of the slip with or without water and therefore in some of the above described experiments Abalyn was omitted.

Monolithic ceramic capacitors were made using Newtonian slips as those described above. The slip flows over a dam in a slip reservoir into a pan. In a continuous cycle the slip is pumped from the pan into the resevoir. A flat porous substrate or carrier, e.g. a piece of cardboard, is passed horizontally, at least once, through a central portion of the falling sheet to deposit a slip layer or layers on the carrier. The solvent is driven off by heating the layer(s) at 50° C. for four minutes. A rectangular matrix of electroding-ink-film patches is screen printed or otherwise deposited onto the dried layer. This assembly is again passed through the falling sheet and dried. An electroding-ink matrix of patches, usually of slightly different design, is deposited on the second and thereafter alternate dried-slip layers. Typically twenty to forty more ceramic slip layers and electroding-ink films are deposited to form a stack having a top layer of ceramic. The two afore-mentioned ink matrix designs are alternated and registered with each other in such a way that when the stack is subsequently cut into pieces, each piece contains buried electrode films, one group extending to one cut surface of the piece and an alternate electrode film group extending to an opposite cut surface of the piece. The cutting may be by drawing a razor blade through the stack in rows and columns corresponding to those of the registered matrices of ink-film patches in the stack. The pieces are then fired to burn out the remaining organic material including the binder and plasticizer. Two terminations are applied to the above noted two opposite cut surfaces, respectively, to contact the two groups of buried electrodes.

When the pseudoplastic slips of the prior art are compared with Newtonian slips of this invention having the same ratio of solids to solvent, it is clear from the examples that the latter are very much less viscous even at low shear rates. For example compare the pairs of examples 36/32, 25/22 and 14/13. From another viewpoint, for a given viscosity (for example at 30 cps) the Newtonian slips of this invention will employ less solvent and have a higher solids to solvent ratio.

It has also been found that capacitors with very thick buried electrode film tend to be more prone to pin holes. For a special situation wherein especially low resistivity electrodes were needed, a number of experimental capacitors were made. The fired thickness of the electrode films varied from 2 to 8 microns. Using pseudoplastic slips, only capacitors of low quality could be made with electrodes with the thicker (6-8 microns) buried electrodes. Of the several Newtonian slips tried, all were found capable of making high quality capacitors containing 8 microns thick buried electrodes.

Thus orders of magnitude fewer microscopic pin holes in monolithic ceramic capacitors of this invention are expected to lead to improved life test results and generally better quality capacitors.

Perhaps even more importantly, the curtain coated layers of Newtonian slips of this invention level. Without surface irregularities reflecting the pattern of the underlying electrode films, they present a planar upper surface to which the next electrode film patches are reliably deposited.

TABLE 1

| | | Composition (wt. per 100 g $BaTiO_3$ powder) | | | | | Solids | Brookfield Viscosity | | | | | |
| | | Resin | Aba- | Solvent | | Surfactant | | | Spindle Speed (#2) r.p.m. | | | | | |
| Ex. | Type | Amt. | lyn | Type | Amt. | Type | Amt. | Wt. % | 1.5 | 3.0 | 6.0 | 12.0 | 30.0 | 60.0 |
| --- | --- | --- | --- | --- | --- | --- | --- | --- | --- | --- | --- | --- | --- | --- |
| 1 | 2044 | 3.3 | 0.84 | xylene | 20.4 | | | 75.0 | 52000 | 43200 | 28900 | 18250 | 9740 | 6100 |

TABLE 1-continued

| | Composition (wt. per 100 g BaTiO$_3$ powder) | | | | | | | Solids | Brookfield Viscosity | | | | | |
|---|---|---|---|---|---|---|---|---|---|---|---|---|---|---|
| | Resin | | Aba- | Solvent | | Surfactant | | | Spindle Speed (#2) r.p.m. | | | | | |
| Ex. | Type | Amt. | lyn | Type | Amt. | Type | Amt. | Wt. % | 1.5 | 3.0 | 6.0 | 12.0 | 30.0 | 60.0 |
| 2 | 2044 | 3.3 | 0.84 | amyl-a. xylene | 8.75 20.4 | Alcolec | 0.25 | 74.9 | 15600 | 8800 | 6300 | 3900 | 1900 | 1180 |
| 3 | 2044 | 3.3 | 0.84 | amyl-a. xylene | 8.75 20.4 | Alcolec | 0.75 | 74.8 | 19200 | 12000 | 6700 | 3950 | 2040 | 1230 |
| 4 | 2044 | 3.3 | 0.84 | amyl-a. xylene | 8.75 27.1 | | | 70.0 | 21040 | 12200 | 7020 | 3910 | 1845 | 1075 |
| 5 | 2044 | 3.3 | 0.84 | amyl-a. xylene | 11.6 27.1 | Alcolec | 0.25 | 69.9 | 5660 | 3190 | 1850 | 1065 | 535 | 335 |
| 6 | 2044 | 3.3 | 0.84 | amyl-a. xylene | 11.6 27.1 | Alcolec | 0.75 | 69.8 | 6600 | 3760 | 2175 | 1240 | 615 | 380 |
| 7 | 2044 | 2.5 | | amyl-a. xylene | 11.6 28.25 | Gafac RS-410 | 0.50 | 69.8 | 2900 | 1880 | 1165 | 735 | 370 | 225 |
| 8 | 2044 | 2.5 | | xylene | 40.10 | Gafac RS-410 | 0.25 | 70.0 | 2140 | 1400 | 850 | 515 | 270 | 170 |
| 9 | 2044 | 2.5 | | amyl-a. | 40.35 | Gafac RS-410 | 0.50 | 69.8 | 3240 | 2070 | 1285 | 815 | 410 | 250 |

TABLE 2

| | Composition (wt. per 100 g BaTiO$_3$ powder) | | | | | | | Solids Content | | Brookfield Viscosity | | | | | |
|---|---|---|---|---|---|---|---|---|---|---|---|---|---|---|---|
| | Resin | | Aba- | Solvent | | Surfactant | | | | Spindle Speed (#2) r.p.m. | | | | | |
| Ex. | Type | Amt. | lyn | Type | Amt. | Type | Amt. | Wt. % | Vol. % | 1.5 | 3.0 | 6.0 | 12.0 | 30.0 | 60.0 |
| 10 | 2044 | 3.3 | 0.84 | xylene | 38.7 | | | 70.0 | 26.7 | | 60 | 67.5 | 62 | 54 | 56 |
| 11** | 2044 | 3.3 | 0.84 | xylene | 38.7 | | | 69.9 | | Gelled ($\eta > 100{,}000$). | | | | | |
| 12 | 2044 | 2.5 | | xylene | 30.3 | Gafac RS-410 | 0.50 | 75.0 | 31.8 | 12040 | 6760 | 3875 | 2288 | | |
| 13** | 2044 | 2.5 | | xylene | 30.3 | Gafac RS-410 | 0.50 | 75.0 | | 10640 | 6050 | 3460 | 1955 | 950 | |
| 14 | 2044 | 2.5 | | xylene ethanol | 25.8 4.1 | Gafac RS-410 | 0.50 | 75.0 | | 340 | 260 | 230 | 175 | 143 | 125 |
| 15 | 2044 | 2.5 | | xylene ethanol | 21.2 8.2 | Gafac RS-410 | 0.50 | 75.0 | | | | | 35 | 42 | 48 |
| 16** | 2044 | 2.5 | | xylene ethanol | 21.2 8.2 | Gafac RS-410 | 0.50 | 75.0 | | | | | 53 | 46 | 50 |
| 17 | 2044 | 2.5 | | xylene ethanol | 15.4 6.6 | Gafac RS-410 | 0.50 | 80.0 | 37.8 | 100 | 100 | 125 | 110 | 110 | 110 |
| 18 | 2044 | 5.0 | | xylene pr alc. | 14.8 13.1 | Gafac RS-410 | 0.50 | 74.9 | | 120 | 140 | 165 | 145 | 160 | 160 |
| 19* | 2044 | 3.5 | | xylene me cell. | 8.95 20.9 | Gafac RK-500 | 0.50 | 74.7 | | | | 70 | 75 | 75 | 70 |
| 20 | 2014 | 3.0 | | xylene | 30.3 | | | 75.0 | 31.7 | 160 | 150 | 135 | 100 | 110 | 115 |
| 21* | 2014 | 3.0 | | xylene | 30.3 | | | 75.0 | | 100 | 115 | 105 | 95 | 120 | 155 |
| 22 | 2014 | 3.5 | 0.88 | xylene | 30.0 | | | 74.4 | | 140 | 150 | 160 | 140 | 160 | 170 |
| 23 | 2014 | 3.5 | 3.5 | xylene | 27.3 | | | 74.4 | | 160 | 210 | 220 | 190 | 190 | 200 |
| 24* | 2014 | 3.5 | 3.5 | xylene | 27.3 | | | 74.4 | | 180 | 200 | 200 | 190 | 200 | 225 |
| 25 | 2014 | 3.5 | | xylene | 29.8 | Gafac RK-500 | 0.25 | 74.9 | | 4220 | 2470 | 1600 | 1030 | 620 | 440 |
| 25a | 2044 | 2.5 | | xylene | 30.3 | | | 75.0 | | | 40 | 80 | 90 | 79 | 85 |
| 25b* | Butv | 2.5 | | xylene pr alc. | 15.4 13.7 | | | 75.0 | | | 880 | 820 | 810 | 780 | 788 |
| 25c* | Butv | 2.5 | | xylene pr alc. | 15.4 13.7 | Gafac RS-410 | 0.50 | | | | 520 | 560 | 580 | 584 | 584 |

*0.25% water added
**plus 0.25 wt. % water in the slip

TABLE 3

| | Composition (wt. per 100 g PLZT powder) | | | | | | | Solids Content | | Brookfield Viscosity | | | | | |
|---|---|---|---|---|---|---|---|---|---|---|---|---|---|---|---|
| | Resin | | Aba- | Solvent | | Surfactant | | | | Spindle Speed (#2) r.p.m. | | | | | |
| Ex. | Type | Amt. | lyn | Type | Amt. | Type | Amt. | Wt. % | Vol. % | 1.5 | 3.0 | 6.0 | 12.0 | 30.0 | 60.0 |
| 26 | 2044 | 2.3 | 0.65 | xylene amyl-a. | 17.0 7.3 | Gafac RE-610 | 0.8 | 78.1 | 30.5 | 4800 | 2880 | 1580 | 1020 | 530 | 330 |
| 27* | 2044 | 2.75 | 0.75 | bu alc. xylene | 13.1 5.7 | Gafac RE-610 | 0.4 | 81.5 | 34.2 | | 140 | 160 | 145 | 150 | 150 |
| 28* | 2044 | 2.35 | 0.75 | et cell. xylene | 13.1 5.7 | Gafac RE-610 | 0.4 | 81.5 | 36.1 | 160 | 160 | 175 | 165 | 165 | 160 |
| 29* | 2014 | 2.75 | 1.3 | xylene | 26.2 | Gafac RE-610 | 0.4 | 76.8 | 29.1 | 220 | 200 | 195 | 200 | 205 | 215 |
| 30 | 2014 | 2.3 | 1.3 | xylene | 19.2 | | | 81.5 | 35.4 | 1520 | 1440 | 1760 | 2260 | 2900 | |

*0.25% water added

TABLE 4

| Ex. | Composition (wt. per 100 g TiO$_2$ powder) | | | | | | | Solids Content | | Brookfield Viscosity Spindle Speed (#2) r.p.m. | | | | | |
|---|---|---|---|---|---|---|---|---|---|---|---|---|---|---|---|
| | Resin | | Aba- | Solvent | | Surfactant | | | | | | | | | |
| | Type | Amt. | lyn | Type | Amt. | Type | Amt. | Wt. % | Vol. % | 1.5 | 3.0 | 6.0 | 12.0 | 30.0 | 60.0 |
| 31* | 2014 | 4.5 | | xylene | 79.2 | | | 54.4 | 20.0 | | 16 | 21 | 19 | 18 | 17 |
| 32* | 2014 | 4.5 | | xylene | 58.5 | | | 61.4 | 25.0 | 60 | 80 | 90 | 75 | 60 | 60 |
| 33* | 2014 | 4.5 | | xylene | 44.7 | | | 67.0 | 30.0 | 620 | 600 | 580 | 480 | 400 | 370 |
| 34* | 2014 | 2.6 | | xylene | 46.2 | | | 67.2 | 30.0 | 470 | 365 | 300 | 240 | 175 | 140 |
| 35* | 2044 | 4.5 | | xylene | 58.5 | | | 61.4 | 25.0 | 140 | 140 | 125 | 115 | 105 | 90 |
| 36 | 2044 | 4.5 | | bu alc. xylene | 40.9 17.5 | Gafac RK-500 | 1.0 | 61.4 | 25.0 | 5680 | 3300 | 1940 | 1150 | 600 | 390 |
| 37 | Butv | 4.5 | | xylene bu alc. | 55.4 21.9 | | | 55.0 | 20.0 | 120 | 150 | 140 | 118 | 112 | 99 |

*0.25% water added

What is claimed is:

1. A method for making a monolithic ceramic capacitor comprising:
   (a) dispersing a ceramic powder, having an average particle size from 0.5 to 1.5 μm, in a liquid vehicle consisting essentially of a solvent of a non-halogenated hydrocarbon plus 0–70% by weight of an alcohol, having dissolved therein a resin binder and a plasticizer, to form a water-insensitive Newtonian slip having a Brookfield viscosity of less than 700 centipoises over the range of 3 to 30 revolutions per minute of a number 2 Brookfield spindle;
   (b) providing a falling sheet of said Newtonian slip;
   (c) passing a flat porous substrate horizontally through said falling sheet to coat said substrate with a first level layer of said slip, and drying said first layer;
   (d) depositing film patches of an electroding ink in the pattern of a matrix on the surface of said first layer creating ink bumps on said first layer surface;
   (e) passing said substrate again through said falling sheet to deposit another level layer of said slip over said electroded first layer, said second level layer flowing and leveling to acquire an upper surface that is planar and free of irregularities reflecting said pattern of the underlying ink, and drying said second level layer;
   (f) repeating steps (d) and (e) as many times as is desired to produce a stack of dried level slip layers interleaved by patterns of electroding ink;
   (g) separating said stack into pieces each having at least one buried electrode and at least another electrode extending respectively to two-spaced apart surface portions of said each piece;
   (h) firing said pieces to burn out said binder and sinter said ceramic to maturity to transform said pieces to monolithic ceramic capacitor bodies; and
   (i) applying two terminations to each of said bodies at said two surface portions, respectively, to form monolithic ceramic capacitors.

* * * * *